United States Patent [19]
Wigal

[11] 3,792,490
[45] Feb. 12, 1974

[54] MINIATURE SOUND RECORDING AND REPRODUCING DEVICE

[76] Inventor: Voorhis F. Wigal, P.O. Box 1542, Jackson, Tenn. 38301

[22] Filed: Feb. 1, 1972

[21] Appl. No.: 222,618

[52] U.S. Cl. .................. 360/62, 360/89, 360/118
[51] Int. Cl. .......................................... G11b 15/32
[58] Field of Search ......... 274/1.1, 11 R, 11 E, 4 R; 179/100.2 D

[56] References Cited

UNITED STATES PATENTS

| | | | |
|---|---|---|---|
| 3,159,942 | 12/1964 | Fiske | 274/1 A |
| 2,535,498 | 12/1950 | Kornei | 179/100.2 D |
| 2,861,133 | 11/1958 | Herr | 179/100.2 D |
| 3,548,113 | 12/1970 | Althuber | 179/100.2 D |
| 3,162,980 | 12/1964 | Hellman | 274/1 A |
| 2,604,550 | 7/1952 | Begun | 179/100.2 D |
| 2,617,890 | 11/1952 | Barany et al. | 179/100.2 D |
| 3,531,062 | 9/1970 | Sindlinger | 274/11 R |
| 3,080,679 | 3/1963 | Hardigan | 274/4 D |
| 3,486,675 | 12/1969 | Krechman | 274/4 B |
| 3,217,996 | 11/1965 | Bernier | 274/4 D |
| 3,107,279 | 10/1963 | Hanesetal | 274/4 D |

*Primary Examiner*—Harry N. Haroian
*Attorney, Agent, or Firm*—John R. Walker, III

[57] ABSTRACT

A device for recording messages of short duration which may be audibly reproduced repeatedly by simply pulling a cord. The device employs spring power for transporting magnetic tape across a magnetic record-playback head, i.e., being completely void of electric motors or the like. Also included are novel sound recording, reproducing, and amplifying circuitry; switching structure; and structure for erasing the recorded messages from the tape. A low voltage battery, e.g., three volts, is provided to supply electrical energy to power the recording, reproducing and amplifying circuitry. The device is particularly adaptable for inclusion in a wide variety of items, e. g., dolls, animal figures, etc.

3 Claims, 8 Drawing Figures

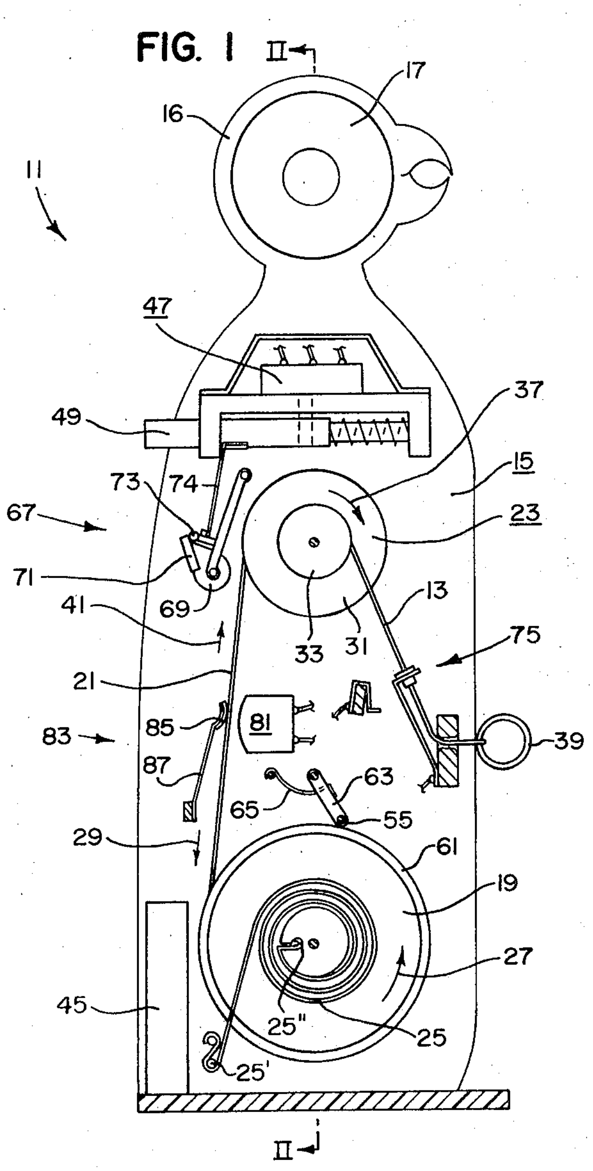
FIG. 1
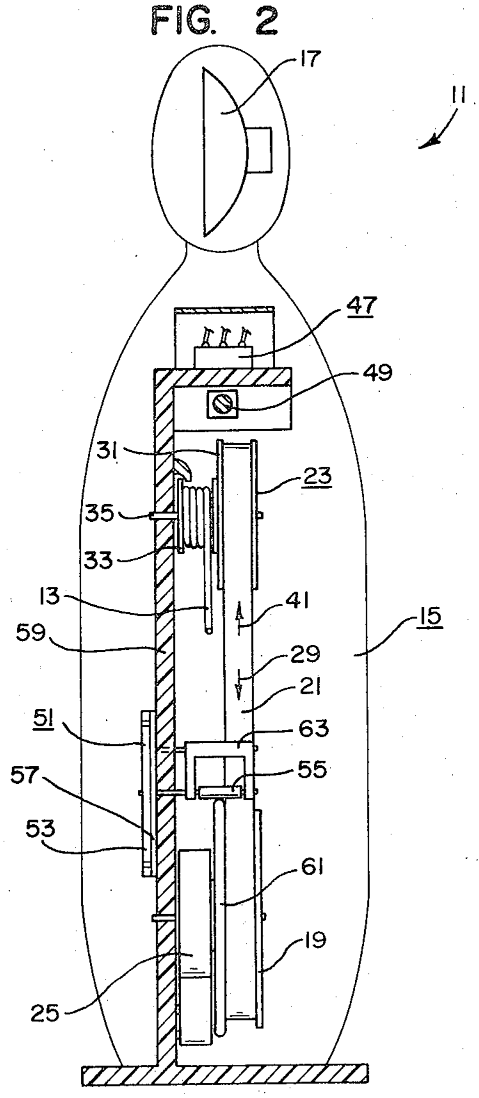
FIG. 2
FIG. 3
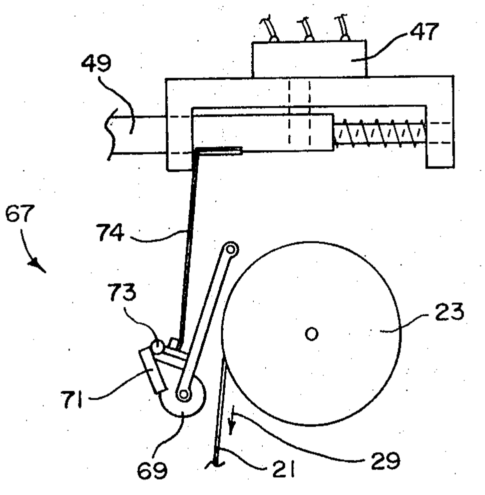
FIG. 4
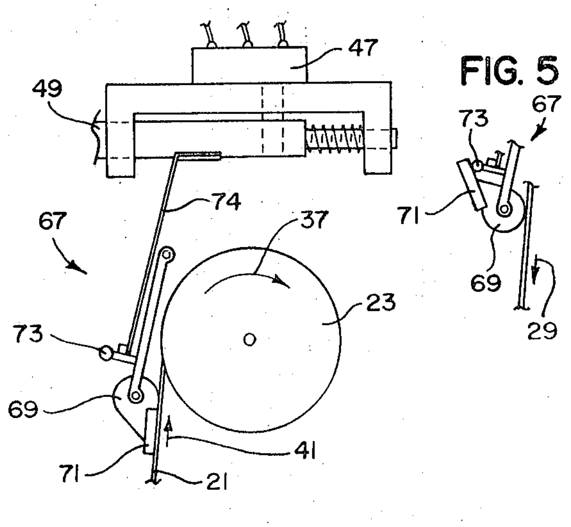
FIG. 5

MINIATURE SOUND RECORDING AND REPRODUCING DEVICE

BACKGROUND OF THE INVENTION

1. Field of the Invention

This invention relates to sound recording and reproducing devices, particularly of the miniature magnetic tape types.

2. Description of the Prior Art

A preliminary search revealed the following U.S. patents: Hardigan Pat. No. 3,080,679; Noshiro Pat. No. 3,165,595; Friedman Pat. No. 3,466,795 and the Sindlinger Pats. No. 3,528,627 and 3,531,062. None of the above references show or suggest applicant's device. However, it should be noted that only the '595 patent pertains to a recording and reproducing device. Further, the '595 patent includes complex circuitry and many expensive electrical components, e. g., a separate microphone, an electric motor, several relays, nine transistors, three transformers, two separate power supplies, etc.

The remainder of the above-mentioned references pertain to unique drive systems, activating means for a doll, and talking dolls. The '679 patent pertains to one such talking doll, which also requires at least two separate voltage sources or batteries, an electric motor, and limit switches which shut off the power supply to the voltage when a Additionally, the '679 patent relies on a tape having a previously recorded message thereon, i. e., incorporating no provisions for recording a child's voice, etc., for subsequent replay.

SUMMARY OF THE INVENTION

The present invention is directed towards overcoming certain disadvantages relative to prior recording and reproducing devices. The concept of the present invention is to provide a device which is simple and inexpensive to manufacture and which is well suited for inclusion in a wide variety of popular items, e.g., dolls, animal figures, etc. The device of the present invention may also be used for language teaching and speech therapy applications.

The device may be given messages of a few words, phrases, or sentences and have them immediately repeated with no more effort than pulling the cord. This same message may be repeated over and over at will or a new message may be given by actuating certain structure included therewith. A magnetic recording head and microphone speaker combination is used in conjunction with a simple amplifying circuit, i. e., preferably including no more than three transistors. For this simple circuit, a very low level of electrical energy is supplied by a small battery source, e. g., 3 volts preferably developed by two size AA batteries arranged in series. The circuit is noticeably void of expensive components, e. g., relays, transformers, etc.

Power on and off control for the circuit is accomplished automatically through a novel switch actuated by tension on the winding cord. This eliminates the need to manually operate a main switch and insures that the circuit will not inadvertently be left closed resulting in excessive battery drain. All switching between recording head, amplifier, microphone, and speaker units, as well as erasing of previously recorded sounds, is accomplished through a multi-pole double throw switch. Unique structure is employed for bringing a magnet into engagement with the magnetic tape for erasing previously recorded sounds.

BRIEF DESCRIPTION OF THE DRAWINGS

FIG. 1 is a partial side elevational view of the sound recording and reproducing device of the present invention, having certain structure thereof removed for clarity.

FIG. 2 is a sectional view taken as on the line II—II of FIG. 1.

FIG. 3 is an enlarged view of the erase structure shown in a stowed and idle position.

FIG. 4 is substantially identical to FIG. 3 except the erase structure is shown in an operable and drive position.

FIG. 5 is a fragmentary view substantially identical to a portion of FIGS. 3 and 4 except the erase structure is shown in a stowed and drive position.

DESCRIPTION OF THE PREFERRED EMBODIMENT

Figure 6:
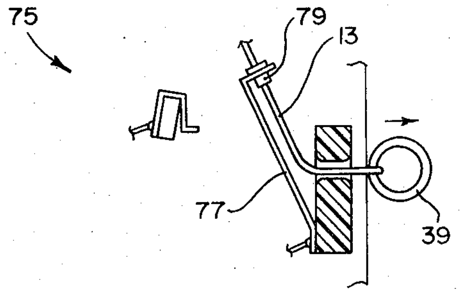
FIG. 6 is an enlarged fragmentary view of the novel tension actuated switch, shown in an open or power off position with tension on the pull string.

The miniature sound recording and reproducing device 11 of the present invention concerns a simple low cost spring driven apparatus which can be made to take and repeat brief messages merely by pulling and releasing a winding cord 13. The small size, ease and simplicity of operation, uncomplicated structure and strong construction makes the device 11 well suited for inclusion in a wide variety of popular items, such as dolls, animal figures, and other such toys. The device 11, as herein depicted, is shown suitably fitted into a hollow toy parrot body 15. The head 16 of the parrot preferably receives a permanent magnet speaker-microphone 17. Therefore, head 16 preferably is perforated, not shown, to more readily allow passage therethrough of sound waves in a manner obvious to those skilled in the art.

The device 11 includes a first reel or take-up reel 19 for holding portions of a magnetic tape 21. Also included is a second reel or supply reel 23 for also holding certain portions of the magnetic tape 21. In other words, one end of the tape 21 is attached to the take up reel 19 and the other end is attached to the supply reel 23 in a manner obvious to those skilled in the art.

A windup spring 25 is anchored at one end to the parrot body 15 as at 25' and anchored at the other end to take up reel 19 as at 25'' for urging the take up reel 19 in a rotational direction as indicated by the arrow 27. The loaded spring 25 winds portions of the tape 21 onto the take up reel 19 and unwinds portions thereof from the supply reel 23 with the tape 21 moving in a forward direction as indicated by the arrow 29, i. e., towards the take up reel 19.

From FIGS. 1 and 2 of the drawings, it may be seen that the supply reel 23 includes first and second drums 31, 33 attached one to the other for simultaneous rotation about a common shaft 35. The first drum 31 receives convolutions of the magnetic tape 21 and the second drum 33 receives convolutions of the winding cord or pull string 13. Accordingly, one end of the pull string 13 is attached to the second drum 33 for manually urging the first drum 31 in a rotational direction indicated by the arrow 37. In other words, the user grasps a ring 39 attached to the pull string 13 and applies a pulling force thereto which winds portions of the tape 21 onto the drum 31 and unwinds portions of the tape 21 from the take up reel 19 against the force of the spring 25 and with the tape 21 moving in a reverse direction as indicated by an arrow 41, i. e., towards the reel 23, thus loading the spring 25. The operator then releases the ring 39, enabling the spring 25 to rewind portions of the tape 21 onto the take up reel 19 and unwind portions of the tape 21 from the supply reel 23 with the tape 21 moving in the forward direction as indicated by the arrow 29.

Figure 8:
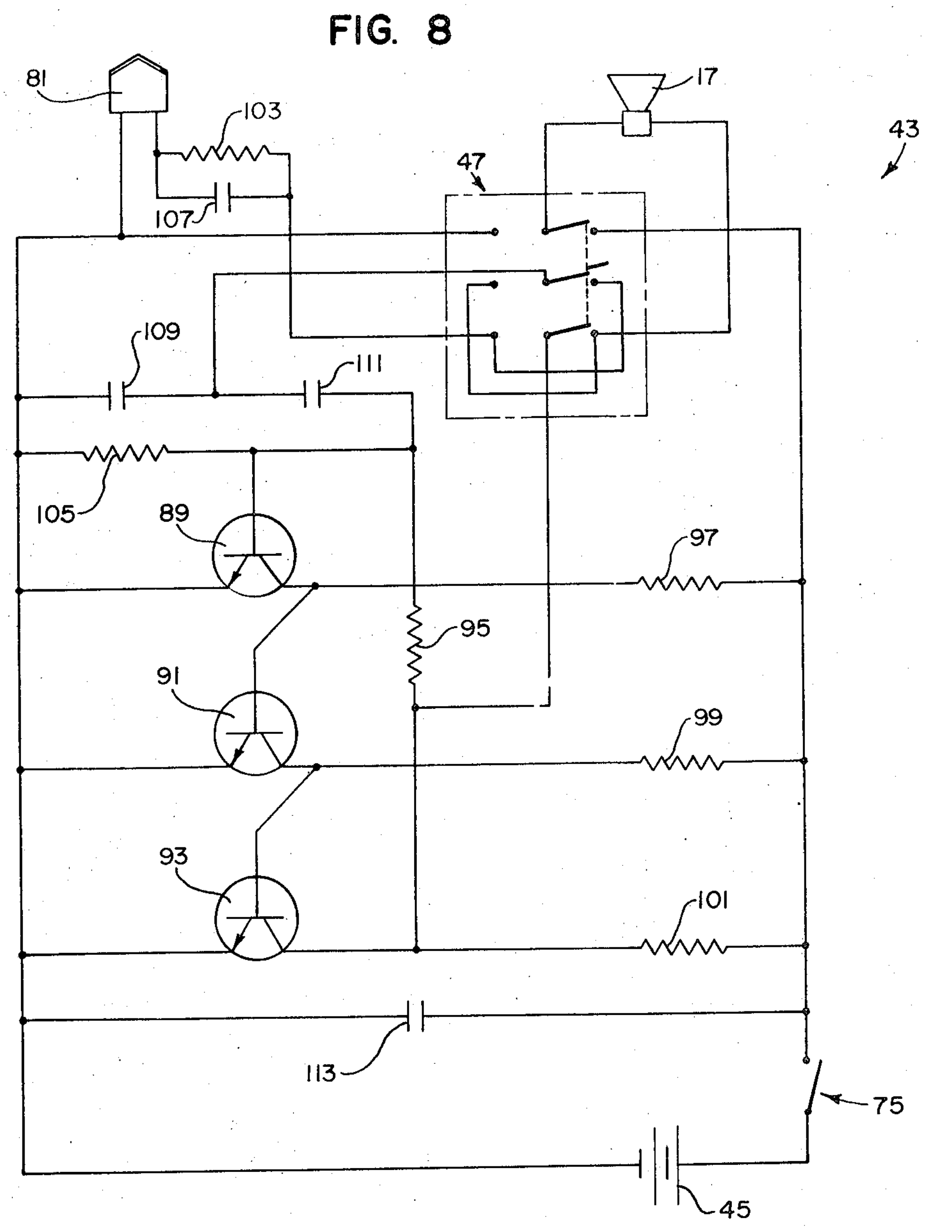
FIG. 8 is a complete schematic of the novel circuit of the sound recording and reproducing device of the present invention.

Recording and reproducing means 43 are included for recording sounds onto the magnetic tape 21 as the tape is moved in the direction of the arrow 29 and for reproducing the recorded sounds from the magnetic tape 19 when it is subsequently moved in the direciton of the arrow 29. The recording and reproducing means 43 are schematically depicted in FIG. 8 of the drawings and will be more fully disclosed later in the specification. Storage battery means 45 are included for providing a voltage source to power the recording and reproducing means 43. In this regard, I prefer to use a pair of typical size AA batteries arranged in series one with the other, thus providing a three volt power supply.

A first switch or multi-pole switch, which in the example shown is a three pole double throw switch, is included and has a record/erase position and a playback position for selectively activating the recording portion and the reproducing portion of the recording and reproducing means 43. It should be appreciated that all switching between the recording portion of the means 43 and the reproducing portion of the means 43, as well as erasing of previously recorded sounds from the tape 21, is accomplished by throwing the switch 47. The switch 47 is schematically depicted in FIG. 8 of the drawings, and certain structure thereof yet to be disclosed is depicted in FIGS. 1 – 5 of the drawings. The switch 47 is provided with a pushbutton actuating lever 49 and is spring loaded to the playback position. It should be understood that the switch 47 is in the playback position when the movable contacts thereof are moved to the right as viewed in FIG. 8. Further, the switch 47 is in the record/erase position when the movable contacts thereof are moved to the left as viewed in FIG. 8. In other words, pushing the lever 49 throws the switch 47 to the record/erase position and releasing the lever 49 automatically causes it to return to the playback position.

A governor assembly 51 is included to control the rate of rotation of the take up reel 19 while rotating in the direction of the arrow 27. The governor assembly 51 preferably includes a sectioned flyweight disk 53 attached to a shaft 55. That is, the flyweight sections (not shown) of the disk 53 are attached to a piece of felt cloth 57 or the like which is suitably attached centrally thereof to the outer end of the shaft 55. The shaft 55 extends through a suitable aperture in the frame structure 59 which may be formed from plexiglas or the like. However, the flyweight sections of the disk 53 have suitable thickness thereto which causes a dynamic unbalanced condition thereof. More specifically, the felt cloth 57 is in close proximity to the outer surface of the frame structure 59 when the governor 51 is in a static condition. The forces acting upon the rotating flyweight sections tend to move them in a direction parallel with the rotating axis thereof or towards the frame structure 59. This creates or increases friction or drag as the felt cloth 57 is urged against the surface ofthe frame structure 57. The friction created is directly proportionate to the speed of the governor assembly 51, thereby controlling the rate of rotation.

The take up reel 19 includes an O-ring 61 which acts as a tire to drive the governor assembly 51. More specifically, a shaft support member 63 supports the shaft 55 and is pivotally attached to the frame structure 59. A leaf spring 65 urges the inner portion of the shaft 55 against the O-ring 61 when the reel 19 is rotating in the direction of the arrow 27. Conversely, the support member 63 will allow the shaft 55 to move away from the O-ring 61 as the pull string 13 is pulled, i. e., as the reel 19 is rotated in a direction opposite to the arrow 27.

The device 11 also includes erasing means 67 for selectively erasing the recorded sounds from the magnetic tape 21. Referring now to FIGS. 3 – 5 of the drawings wherein it may be seen that the erasing means is actuated by pushing the pushbutton 49. The erasing means 67 includes a roller 69 and a permanent magnet 71 fixedly attached to the roller 69. The roller 69 has an idle position, as shown in FIG. 3 of the drawings, and a drive position, as shown in FIGS. 4 and 5 of the drawings, wherein the roller 69 engages the tape 21. The magnet 71 has a stowed position, as shown in FIGS. 3 and 5 of the drawings and an operable position as shown in FIG. 4 of the drawings wherein the magnet contiguously engages the tape 21. In other words, depressing the pushbutton 49 of the switch 47 moves the roller 69 from the idle position to the drive position and the direction of movement of the tape 21 determines whether the magnet 71 is in the stowed or operable position. That is, pulling the string 13 causes the reel 23 to rotate in the direction of the arrow 37 and the tape 21 to move in the direction of the arrow 41, thus frictionally driving the roller 69 in a counterclockwise direction as viewed in FIG. 4 which moves the magnet 71 to the operable position. Conversely, releasing the pullstring 13 allows the spring 25 to cause the reel 19 to rotate in the direction of the arrow 27 which moves the tape 21 in the direction of the arrow 29. Thus, the roller 69 is frictionally rotated clockwise as viewed in FIG. 5 of the drawings, which moves the magnet 71 to the stowed position.

The erase means 67 also includes a keeper 73 formed from a bar of soft iron or the like for holding the magnet 71 in the stowed position at all times except when the pushbutton 49 is depressed, and the pullstring 13 is in the process of being pulled. Additionally, a leafspring 74 is provided for urging the roller 69 firmly against the tape 21 to insure adequate rotation of the roller 69 for pulling it from the keeper 73.

Figure 7:
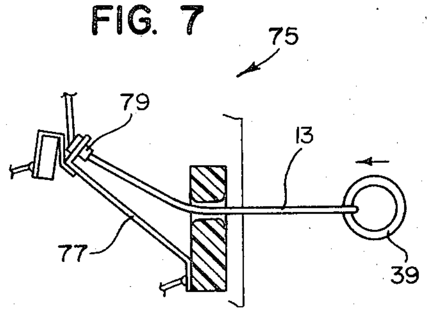
FIG. 7 is substantially identical to FIG. 5 except the switch is shown in a closed or power on position while the string is being wound or not under tension.

A novel tension switch 75 is included for conserving the battery means 45. The switch 75 has a closed or power on position as depicted in FIG. 7 of the drawings and an open or power off position as depicted in FIG. 6 of the drawings. The switch 75 completes the circuit between the battery 45 and the recording and reproducing means 43 when in the power on position and interrupts the circuit between the battery 45 and the recording and reproducing means 43 when in the power off position. The switch 75 is biased toward the power on position by a leaf spring 77. The leaf spring 77 also serves as the movably contact for the switch 75, i. e., it carries the current from the battery 45 when the switch 75 is closed. A string guide 79 is attached to the leaf spring 77 and the pullstring 13 freely passes therethrough. Accordingly, when the pullstring 13 is under tension as illustrated in FIGS. 1 and 6 of the drawings, the switch 75 remains open or in the power off position.

The recording and reproducing means 43 includes a typical magnetic record-playback head 81 which is clearly depicted in FIGS. 1 and 8 of the drawings. Referring again to FIG. 1 of the drawings wherein it may be seen that when the tape 21 is moved in the direction of the arrow 41, i. e., against the tension of the spring 25, the tape 21 is lifted away from the head 81. On the other hand, when the spring 25 causes the tape 21 to move in a direction of the arrow 29, i. e., the tape 21 being substantially void of resistance against unwinding from the reel 23, the tape 21 may easily be urged against the head 81. Accordingly, a pressure pad 83 is included for urging a portion of the magnetic tape 21 against the head 81 while the tape 21 is moving in the direction of the arrow 29. The novel positioning of the head 81 precludes the magnetic tape 21 from engaging the head 81 while the tape 21 is moving in the direction of the arrow 41. In other words, the usual practice is to position the magnetic record-playback head outwardly from a tangent line intersecting the supply drum and the take up drum, e. g., like the head 19 shown in FIG. 2 of the Hardigan '679 patent. I have found that the above-described means for lifting the tape 21 away from the head 81 when the string 13 is pulled greatly prolongs the life of the tape 21. since tension is required on the tape 21 to wind or load the spring 25, it is desirable to eliminate or reduce friction to provide for less abrasion between tape 21 and head 81. The pressure pad 83 preferably includes a felt portion 85 which engages the tape 21 and a leaf spring 87 for urging the felt 85 toward the head 81.

Particular attention is now directed toward FIG. 8 of the drawings wherein it may be seen that I am enabled to provide a recording and reproducing means 43 comprising a total of three transistors 89, 91, 93; six resistors 95, 97, 99, 101, 103, 105; four capacitors 107, 109, 111, 113; the previously mentioned speaker-microphone 17; the previously mentioned power supply 45; the previously mentioned switches 47, 75; and the previously mentioned magnetic record-playback head 81. I have found that transistors 2N2712 are suitable for the transistors 89, 91 and transistor No. 2N2714 is suitable for the transistor 93. However, it will be obvious to those skilled in the art that transistors of other numbers may be used for this purpose which are intended to be within the spirit and scope of the present invention. Further, I suggest the following values for the resistors: Resistor 95 - 620K ohms; Resistor 97 - 26K ohms; resistor 99 - 260 ohms; resistor 101 - 100 ohms; resistor 103 - 6.8K ohms; and resistor 105 - 330K ohms. Further, suitable values for the capacitors are as follows: The capacitor 107 - 0.1 mfd.; capacitor 109 - 0.01 mfd.; capacitor 111 - 0.47 mfd.; and capacitor 113 - 50 mfd. It should be understood that the values just stated for the six resistors and the four capacitors may be varied by those skilled in the art without departing from the spirit and scope of the present invention. From the above disclosure, the schematic as depicted in FIG. 8 of the drawings should be self-explanatory to those skilled in the art.

Although the invention has been described and illustrated with respect to a preferred embodiment thereof, it is to be understood that it is not to be so limited since changes and modifications may be made therein which are within the full intended scope of the invention. I claim:

1. A miniature sound recording and reproducing device comprising a short length of magnetic tape, first reel means for holding certain portions of said magnetic tape, second reel means for also holding certain portions of said magnetic tape, one end of said magnetic tape being attached to said first reel means and the other end thereof being attached to said second reel means, spring means coupled to said first reel means for urging said first reel means in a rotational direction to wind portions of said tape onto said first reel means and unwind portions of said tape from said second reel means with said tape moving in a forward direction towards said first reel means, pull string means coupled to said second reel means for manually urging said second reel means in a rotational direction to wind portions of said tape onto said second reel means and unwind portions of said tape from said first reel means against the force of said spring means with said tape means moving in a reverse direction towards said second reel means whereby upon release of said pull string means said spring means is effective to rewind portions of said tape onto said first reel means and unwind portions of said tape from said second reel means with said tape moving in said forward direction, recording and reproduction means for recording sounds onto said magnetic tape when said tape is moving in said forward direction and for reproducing the recorded sounds from said magnetic tape when said tape is subsequently moved in said forward direction, storage battery means for providing a voltage source to power said recording and reproduction means, first switch means having a record/erase position and a playback position for selectively activating the recording portion and the reproduction portion of the recording and reproduction means, and erase means for selectively erasing the recorded sounds from said magnetic tape means, said erase means including roller means, magnet means fixedly attached to said roller means, said roller means having idle and drive positions thereto, said magnet means having stowed and operable positions thereto, said magnet means contiguously engaging said magnetic tape when in said operable position, said roller means being movable between said idle and drive positions by said first switch means, and keeper means for holding said magnet means in said stowed position, said magnet means being moved from said stowed position to said operable position by fractional rotation of said roller means effected by frictional engagement thereof with said moving magnetic tape.

2. A miniature sound recording and reproducing device comprising a short length of magnetic tape, first reel means for holding certain portions of said magnetic tape, second reel means for also holding certain portions of said magnetic tape, one end of said magnetic tape being attached to said first reel means and the other end thereof being attached to said second reel means, spring means coupled to said first reel means for urging said first reel means in a rotational direction to wind portions of said tape onto said first reel means and unwind portions of said tape from said second reel means with said tape moving in a forward direction towards said first reel means, pull string means coupled to said second reel means for manually urging said second reel means in a rotational direction to wind portions of said tape onto said second reel means and unwind portions of said tape from said first reel means against the force of said spring means with said tape means moving in a reverse direction towards said second reel means whereby upon release of said pull string means said spring means is effective to rewind portions of said tape onto said first reel means and unwind portions of said tape from said second reel means with said tape moving in said forward direction, recording and reproduction means for recording sounds onto said magnetic tape when said tape is moving in said forward direction and for reproducing the recorded sounds from said magnetic tape when said tape is subsequently moved in said forward direction, storage battery means for providing a voltage source to power said recording and reproduction means, and first switch means having a record/erase position and a playback position for selectively activating the recording portion and the reproduction portion of the recording and reproduction means, means for selectively erasing the recorded sounds from said magnetic tape means, and tension switch means for conserving said storage battery means, said tension switch means having a power on position and a power off position, said power on position completing a circuit between said battery means and said recording and reproduction means, said power off position interrupting the circuit between said battery means and said recording and reproduction means, said tension switch means being biased toward said power on position with tension on said pull string means being effective to urge said tension switch means to said power off position.

3. A miniature sound recording and reproducing device comprising a short length of magnetic tape, first reel means for holding certain portions of said magnetic tape, second reel means for also holding certain portions of said magnetic tape, one end of said magnetic tape being attached to said first reel means and the other end thereof being attached to said second reel means, spring means coupled to said first reel means for urging said first reel means in a rotational direction to wind portions of said tape onto said first reel means and unwind portions of said tape from said second reel means with said tape moving in a forward direction towards said first reel means, pull string means coupled to said second reel means for manually urging said second reel means in a rotational direction to wind portions of said tape onto said second reel means and unwind portions of said tape from said first reel means against the force of said spring means with said tape means moving in a reverse direction towards said second reel means whereby upon release of said pull string means said spring means is effective to rewind portions of said tape onto said first reel means and unwind portions of said tape from said second reel means with said tape moving in said forward direction, recording and reproduction means for recording sounds onto said magnetic tape when said tape is moving in said forward direction and for reproducing the recorded sounds from said magnetic tape when said tape is subsequently moved in said forward direction, storage battery means for providing a voltage source to power said recording and reproduction means, first switch means having a record/erase position and a playback position for selectively activating the recording portion and the reproduction portion of said recording and reproduction means, means for erasing the recorded sounds from said magnetic tape means; said erase means including roller means, magnet means fixedly attached to said roller means, said roller means having idle and drive positions thereto, said magnet means having stowed and operable positions thereto, said magnet means contiguously engaging said magnetic tape when in said operable position, said roller means being movable between said idle and drive positions by said first switch means, and keeper means for holding said magnet means in said stowed position, said magnet means being moved from said stowed position to said operable position by fractional rotation of said roller means effected by frictional engagement thereof with said moving magnetic tape; tension switch means for conserving said storage battery means, said tension switch means having a power on position and a power off position, said power on position completing a circuit between said battery means and said recording and reproduction means, said power off position interrupting the circuit between said battery means and said recording and reproduction means, said tension switch means being biased toward said power on position with tension on said pull string means being effective to urge said tension switch means to said power off position; and said recording and reproduction means including a magnetic record-playback head, means for urging a portion of said magnetic tape against said magnetic record-playback head while said magnetic tape is moving in said forward direction and for precluding said magnetic tape from engaging said magnetic record-playback head while said magnetic tape is moving in said reverse direction.

* * * * *